United States Patent [19]

Takizawa et al.

[11] 4,196,907
[45] Apr. 8, 1980

[54] RECORD PLAYER

[75] Inventors: Kazuyuki Takizawa, Inzai; Toshio Sato, Tokohama; Makoto Kodama; Shiro Yasuda, both of Yokohama, all of Japan

[73] Assignee: Sony Corporation, Tokyo, Japan

[21] Appl. No.: 878,658

[22] Filed: Feb. 16, 1978

[30] Foreign Application Priority Data

Feb. 28, 1977 [JP] Japan .................................. 52/21854
Mar. 18, 1977 [JP] Japan .................................. 52/30014

[51] Int. Cl.² ........................................... G11B 15/00
[52] U.S. Cl. ................................................... 274/10 C
[58] Field of Search ........................... 274/10 C, 10 R

[56] References Cited

U.S. PATENT DOCUMENTS

| 1,955,939 | 4/1934 | Bishop | 274/10 C |
|---|---|---|---|
| 1,967,599 | 7/1934 | Thompsett et al. | 274/10 C |
| 2,265,048 | 12/1941 | Tsuchiya | 274/10 C |
| 2,492,874 | 12/1949 | Matarazzo | 274/10 C |
| 4,123,066 | 10/1978 | Minemura et al. | 274/10 C |

FOREIGN PATENT DOCUMENTS

| 676426 | 7/1952 | United Kingdom | 274/10 C |
| 1183243 | 3/1970 | United Kingdom | 274/10 C |

*Primary Examiner*—John W. Shepperd
*Attorney, Agent, or Firm*—Lewis H. Eslinger; Alvin Sinderbrand

[57] ABSTRACT

A record player with a turntable mounted for rotation in a substantially fixed horizontal plane on a chassis and a tone arm for reproducing signals recorded on the surface of a record disc which faces upwardly when the disc is rotatably supported on the turntable, is provided with a record turn-over mechanism comprised of a support structure, for example, in the form of lever assemblies, mounted on the chassis for swinging between raised and lowered positions about an axis which extends parallel to a diameter of the turntable and is disposed to one side of the latter, a pair of spaced apart gripping devices directed inwardly towards each other from end portions, respectively, of the support structure and being axially movable between gripping positions at which the gripping devices are engageable with diametrically opposed locations on the periphery of a record disc and released positions, the gripping devices also being turnable relative to the support structure about a common axis parallel with the axis of swinging movement of the support structure, and cams for effecting the swinging movements of the support structure and the axial and turnable movements of the gripping devices through an operating cycle in which the gripping devices are made to engage a record disc on the turntable with the support structure in its lowered position and then the support structure is moved to its raised position for lifting the engaged disc from the turntable, whereupon the gripping devices are turned through 180° for inverting the lifted record disc and the support structure is then returned to its lowered position and the gripping devices are released for freeing the inverted record disc on the turntable.

20 Claims, 18 Drawing Figures

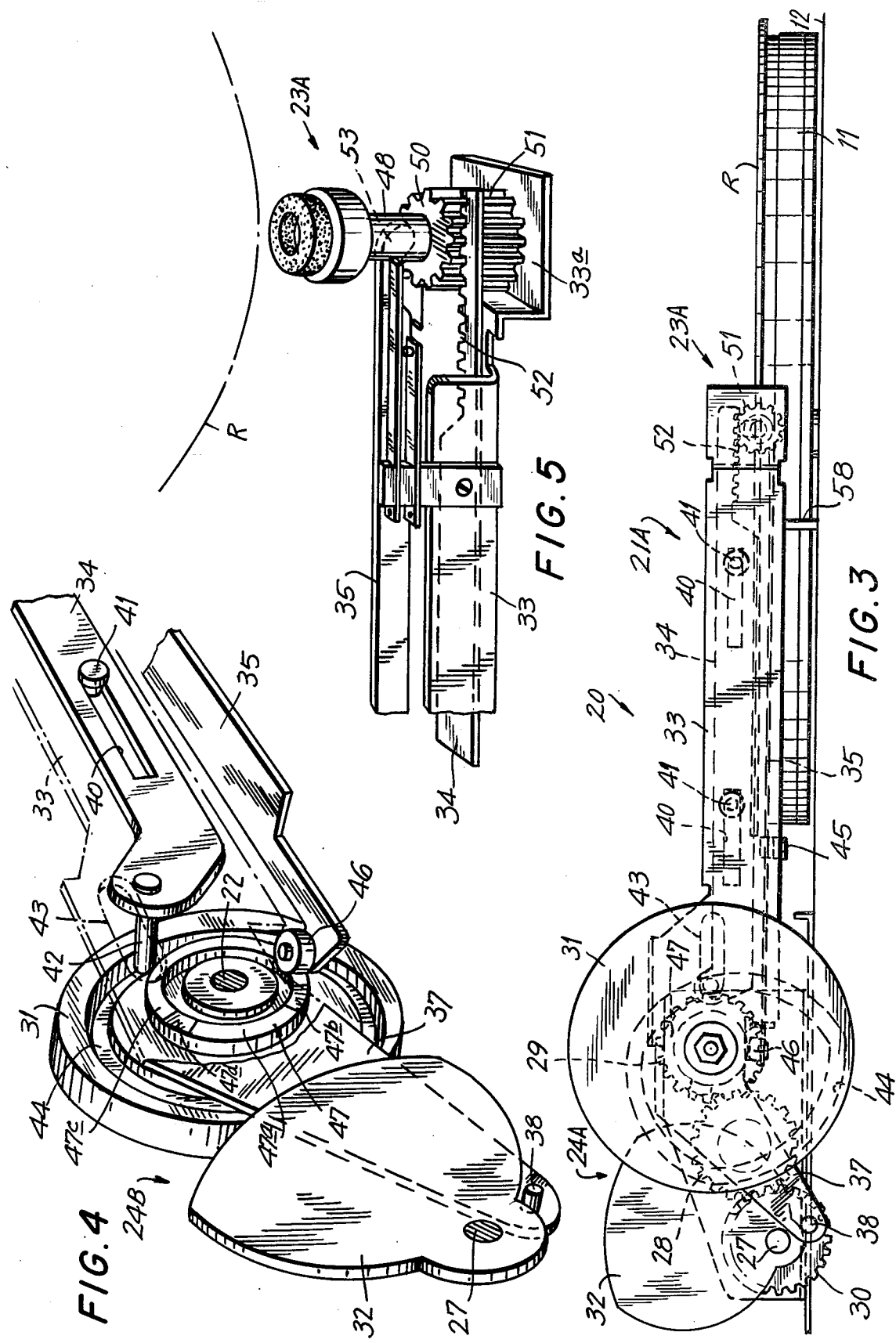

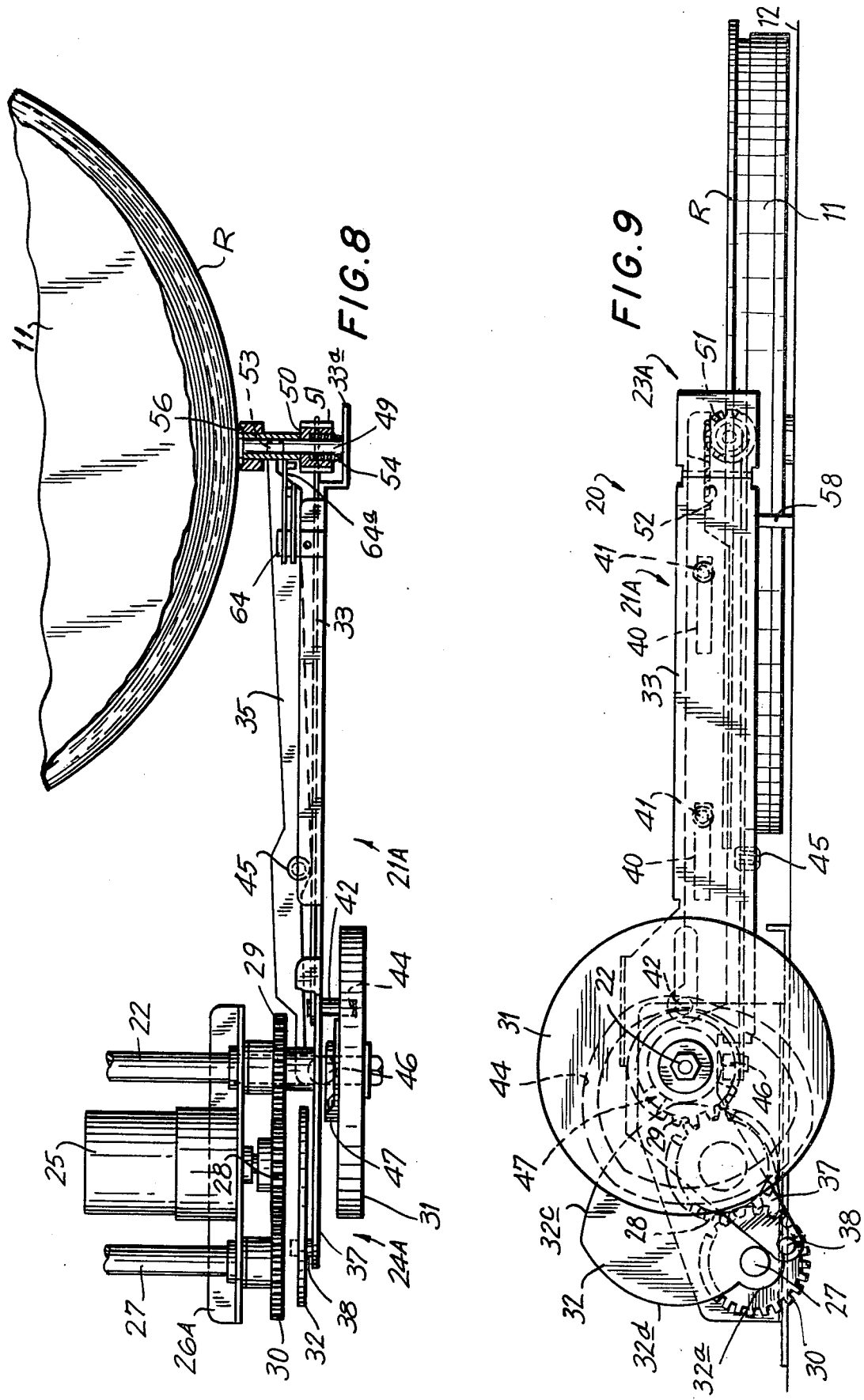

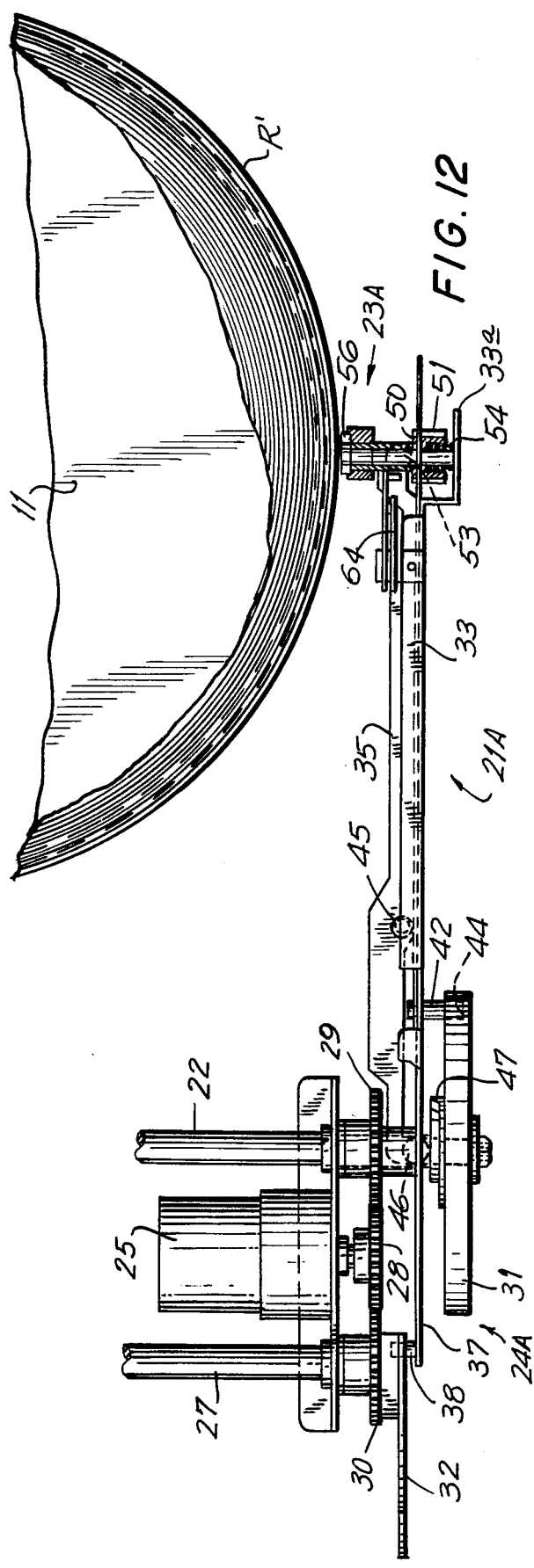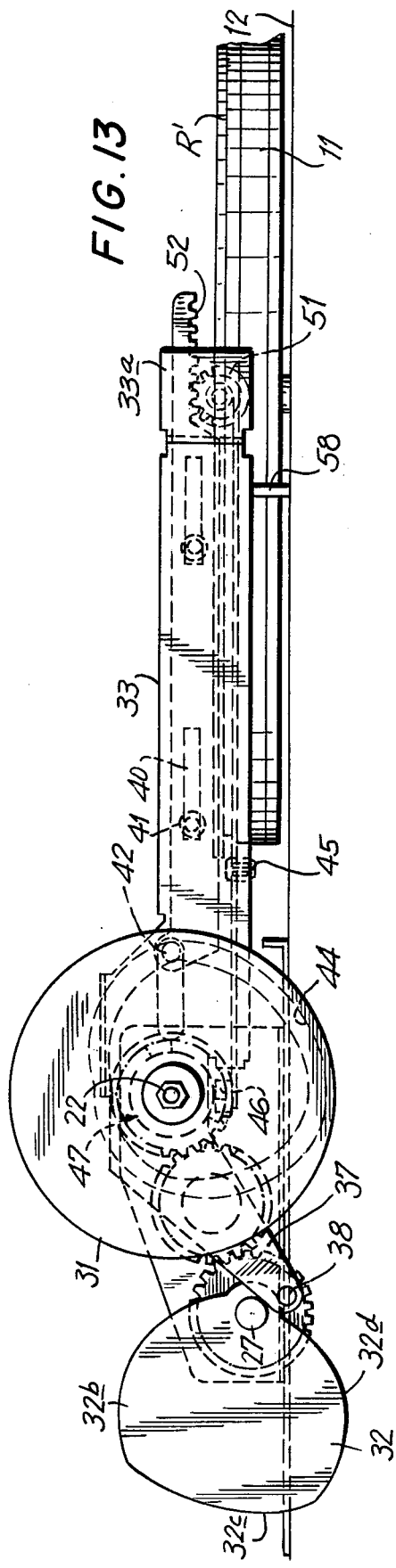

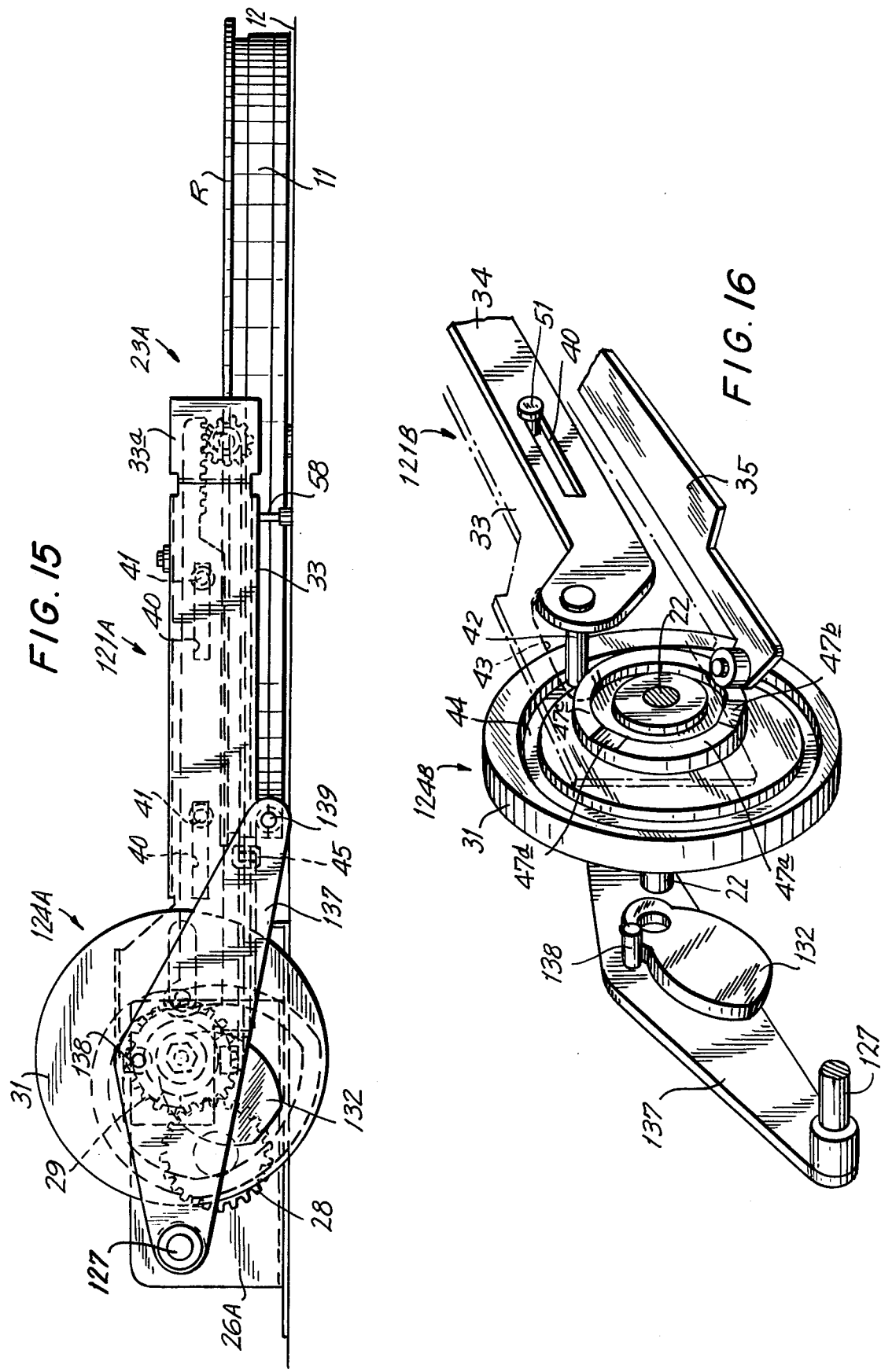

RECORD PLAYER

BACKGROUND OF THE INVENTION

1. Field of the Invention

This invention relates generally to record players, and more particularly is directed to a record player having an improved record turn-over mechanism by which a phonograph or other record disc can be turned-over or inverted after the playing of one side so as to permit the reproduction or playback of signals recorded on both sides or surfaces of the record disc.

2. Description of the Prior Art

Record players of the so called "turn-over" type are already known, for example, as disclosed in detail in U.S. Pat. Nos. 2,601,301, 2,735,683 and 3,275,327. In the record players disclosed in the first two enumerated patents, there is provided a vacuum-grip turntable adapted to grip a record disc by vacuum only at the central ungrooved portion of the disc so as to expose the playing grooves on both sides of the record. Such vacuum-grip turntable is carried by a turntable cradle which is swingable between an upright position in which the turntable faces upward, and an inverted position in which the turntable faces downward. The record player further includes a pivoted record transfer arm carrying a vacuum-grip record lifter and being movable between a position extending over a platform adapted to receive a supply stack of records and a position extending over the turntable in the upright position of the latter. In operating the foregoing record player of the turn-over type, the record transfer arm initially swings over the platform so that the record lifter engages the central portion of the uppermost record in the stack thereon and is evacuated to grip the engaged record. The transfer arm then swings away from the stack and transfers the gripped record to a centered position on the upright turntable. The vacuum grip of the record lifter is released and the record is thereupon gripped and rotated by the turntable. At the conclusion of the playing of the first side of the record, the turntable is inverted to similarly invert the record and the other or second side of the record is played or reproduced. At the conclusion of the playing of the second side of the record, the vacuum grip of the inverted turntable is released, and the record drops therefrom into an underlying record receiver. The foregoing record player of the turn-over type is disadvantageously complex in that it requires devices for the controlled application of vacuum to both the vacuum-grip turntable and the vacuum-grip record lifter, and also in that the turntable has to be mounted, as in the mentioned swingable cradle, for bodily movements between upright and inverted positions. Further, since the turntable continuously grips the record at a side of the latter during the playing of first one side and then the other side of the record, the turntable can only engage the record at the central ungrooved portion of the record so as to expose the playing grooves on both sides thereof.

In U.S. Pat. No. 3,275,327, there is disclosed an improvement over the previously described record player of the turn-over type in which the inverted turntable is carried by the transfer arm and serves as both a record lifter and a turntable, thereby eliminating the necessity for a separate vacuum-grip record lifter. Thus, in the record player of U.S. Pat. No. 3,275,327, the transfer arm is in the form of a pivotally mounted yoke on which the turntable cradle is, in turn, pivotally mounted. In operation of such record player, the yoke and cradle are initially positioned to bring the inverted vacuum-grip turntable down on the uppermost record in a supply stack, so as to grip such uppermost record. The yoke is then swung away from the supply stack to a playing position with the turntable remaining inverted, and a turntable drive wheel then comes into engagement with the rim of a fly wheel rotatably coupled with the turntable so as to drive the latter in the proper direction for playing the record. At the conclusion of the playing of the first side of the record, the yoke swings to a transition position and the turntable cradle is rotated to bring the turntable with the record thereon to an upright position, whereupon the yoke is returned to the playing position and a second turntable driving wheel moves into engagement with the fly wheel for driving the turntable in the proper direction for the playing of the second side.

It will be apparent that the last described record player of the turn-over type still necessarily includes a vacuum-grip turntable engageable with each record only at the relatively small area of the central ungrooved portion of the record so that a major portion of the record remains unsupported during the playing or reproducing of the recorded signals. Such limited support of the record during the reproducing or playback operation and the necessity of bodily moving the turntable for inverting the same make it practically impossible to obtain high fidelity sound reproduction in that a relatively large degree of wow and flutter are encountered. Further, relatively large forces need to be exerted for effecting the inverting of the necessarily heavy turntable and associated fly wheel so that a complex actuating mechanism is required.

More recently, it has been proposed to avoid the above-mentioned problems by providing a record player of the turn-over type in which the turntable need not be inverted, but rather is mounted for rotation in a substantially fixed horizontal plane so as to be capable of fully supporting the record disc during the playback or reproducing operation and further to permit the employment of a secure bearing structure for the rotary mounting of the turntable, for example, as disclosed in detail in Japanese Patent Application No. 49-63674, filed June 4, 1974, and which was laid open for public inspection on Dec. 15, 1975, as Japanese Preliminary Publication No. 50-155204. In such record player, the record turn-over mechanism includes splayed record gripping arms having end portions engageable with opposed peripheral portions of a record disc when the arms are flexed toward each other. In addition to being flexibly connected for movement toward and away from each other, the record gripping arms are mounted for turning about an axis which extends midway between the arms in a plane containing the latter, and further the record gripping arms are mounted for swinging of the plane containing the arms about a horizontal axis which is normal to the mentioned turning axis of the arms and disposed to one side of the turntable. In the operation of the record player presently being described, at the completion of the playing of one side of a record disc on the turntable, the record gripping arms are flexed toward each other so as to engage the record disc at its periphery, whereupon the arms are swung upwardly about the horizontal axis which is to one side of the turntable for lifting the gripped record disc from the turntable. Then, the arms and the record disc gripped therebetween are turned through 180° about the turning axis midway between the arms for inverting the record disc and, thereafter, the arms are swung downwardly for returning the inverted disc to the turntable and the arms are flexed away from each other for releasing the record disc on the turntable and thereby permitting the playing of the other side of the disc.

Although the record player with a turn-over mechanism as disclosed in Japanese Patent No. 49-63674 avoids many of the problems associated with record players having a vacuum-grip turntable which is inverted for turning-over the record disc, as earlier described, the turn-over mechanism of the Japanese Patent Application is relatively complex and costly and lacking in reliability particularly in respect to the structures required to effect the various necessary movements of the record gripping arms in the desired timed sequence.

OBJECTS AND SUMMARY OF THE INVENTION

Accordingly, it is an object of this invention to provide a record player of the turn-over type which avoids the above-discussed disadvantages of the existing record players of that type.

More specitifically, it is an object of this invention to provide a record player of the turn-over type in which the turntable is mounted for rotation in a substantially fixed horizontal plane and is capable of fully supporting a record disc during playback of signals recorded on either of its surfaces, and in which there is provided a record turn-over mechanism having a structural arrangement that facilitates its operation and contributes to the reliability thereof.

Another object is to provide a record player with a turn-over mechanism, as aforesaid, which is structurally independent of the turntable so that the devices provided for inverting a recording disc and thereby permitting the playing of both sides thereof do not interfere with the high fidelity reproduction of the recorded signals.

Another object of the invention is to provide a record player of the turn-over type having a tone arm position detector to permit operation of the record turn-over mechanism only when the tone arm is disposed at its rest position, whereby to avoid possible damage to the tone arm by the turn-over mechanism and further to ensure that the inverting of a record disc by the turn-over mechanism can occur safely without interference from the tone arm.

It is still another object of this invention to provide a record player with a turn-over mechanism which is normally operable to engage a record disc on the turntable and then lift and invert the record disc prior to the return of the latter to the turntable surface, and in which the absence of a record disc from the turntable or the incorrect gripping of a record disc by the turn-over mechanism is detected at the commencement of an operating cycle of the latter so as to abort or prevent continuation of such operating cycle.

A further object is to provide a record player with a turn-over mechanism having gripping members which are yieldably urged by respective springs into frictional gripping engagement with the edge of a record disc at diametrically opposed locations on the latter, whereby to ensure the trouble-free gripping of the record disc without damage to the latter.

A still further object is to provide a record player with a turn-over mechanism, as aforesaid, in which an electric motor is operated to drive the turn-over mechanism through an operating cycle thereof, and the lifting of a record disc from the turntable by the turn-over mechanism in the course of such cycle is spring-assisted so that a powerful motor is not required to drive the turn-over mechanism and further so that the downward or return movement of the record disc onto the turntable following the inverting of the disc is damped or cushioned by the spring or springs.

In accordance with an aspect of this invention, in a record player having a turntable mounted on the chassis for rotation in a substantially fixed horizontal plane, a record turn-over mechanism includes support means mounted on the chassis for swinging movenents between raised and lowered positions about an axis disposed to one side of the turntable and extending substantially parallel to a diameter of the turntable, with end portions of the support means, in the lowered position of the latter, being disposed adjacent opposite ends of said diameter of the turntable, a pair of spaced apart gripping means directed inwardly towards each other from the respective end portions of the support means, with at least parts of the gripping means being axially movable toward and away from each other between gripping positions in which such parts of the gripping means are engageable with diametrically opposed locations on the periphery of a record disc and released positions in which the distance between the parts of the gripping means is larger than the diameter of the record disc for releasing the latter therebetween, such gripping means also being turnable relative to the support means about a common axis parallel with the axis of the swinging movements of the support means, cam means for effecting the swinging movements of the support means and the axial and turnable movements of the gripping means, and means for driving the cam means through an operating cycle in which the gripping means are moved from the released positions to their gripping positions with the support means in its lowered position for engaging a record disc on the turntable and then the support means are moved to the raised position thereof for lifting the engaged record disc from the turntable, whereupon the gripping means are turned through 180° for inverting the lifted record disc and the support means are then returned to the lowered position and the gripping means are restored to their released positions for freeing the inverted record disc on the turntable.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 3 is a front elevational view of the turn-over mechanism shown on FIG. 2;

FIG. 4 is a further enlarged, fragmentary perspective view showing details of a cam assembly and illustrating the cooperation thereof with a lever assembly in the turn-over mechanism of FIG. 1, FIG. 5 is an enlarged, fragmentary perspective view of a record gripping assembly included in the turn-over mechanism of FIG. 1;

FIGS. 8 and 9 are views generally similar to FIGS. 2 and 3, respectively, but showing the turn-over mechanism conditioned to grip or engage a record disc resting on the record player turntable;

FIGS. 12 and 13 are further views similar to FIGS. 8 and 9, respectively, but illustrating the turn-over mechanism at a concluding stage in its operating cycle in which the inverted record disc is returned to the record player turntable and freed from the turn-over mechanism;

FIGS. 15 and 16 are views similar to those of FIGS. 3 and 4, respectively, but illustrating the turn-over mechanism of FIG. 14;

DESCRIPTION OF THE PREFERRED EMBODIMENTS

Figure 1:
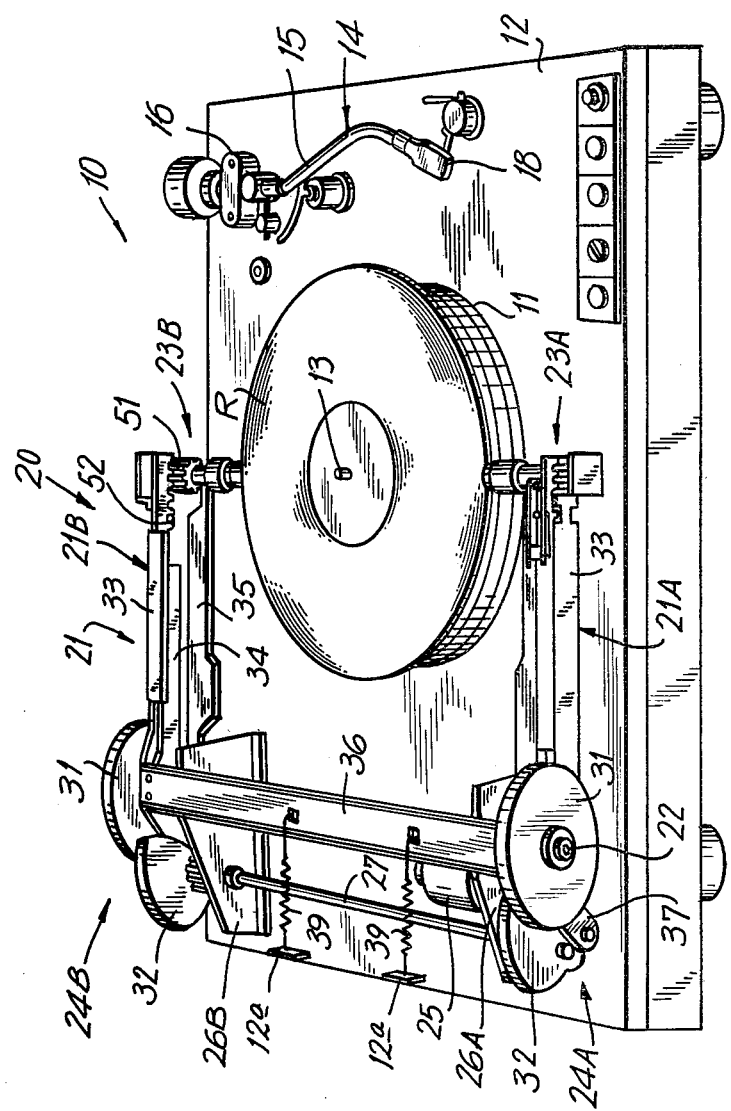
FIG. 1 is a perspective view of a record player with a turn-over mechanism in accordance with an embodiment of this invention.

Referring to the drawings in detail, and initially to FIG. 1 thereof, it will be seen that a record player 10 to which this invention is applied has a turntable 11 mounted on a chassis 12 for rotation about a vertical axis, for example, defined by a spindle 13, and which is substantially fixed relative to the chassis so that turntable 11 rotates in a substantially fixed horizontal plane. A tone arm assembly 14 conventionally includes an elongated tone arm 15 mounted adjacent one end, as by a gimbal 16, on the upper end of a vertical shaft 17 (FIG. 2) which is rotatable in suitable bearings carried by chassis 12, and a head shell 18 extending from the opposite or free end of tone arm 15 to accommodate a cartridge (not shown) from which a stylus or needle depends. By reason of the briefly described mounting of tone arm assembly 14, tone arm 15 is capable of lateral swinging movement about the vertical axis of shaft 17 across turntable 11 and also is capable of being raised and lowered about a horizontal axis defined by gimbal 16 between an elevated rest position outside the perimeter of the turntable, as shown on FIG. 1, where tone arm 15 may be disposed on an arm rest (not shown), and an inner position which corresponds to the engagement of the pick-up stylus in the conventional final non-recorded groove portion of a record disc R on turntable 11. If desired, the record player 10 may further be provided with a suitable conventional automatic control mechanism which, upon manual actuation of a suitable push-button or the like, is effective to cause lead-in movement of tone arm 15 from its rest position to a predetermined set-down position of the stylus on the upwardly facing surface of record disc R for initiating the playing of the sound or other signals recorded on such upwardly facing surface. The conventional automatic control mechanism may further be effective, upon the completion of the reproducing or playing of the signals recorded on the upwardly facing surface of record disc R, to return tone arm 15 to the rest position shown on FIG. 1.

It will be apparent that, to the extent described above, the record player 10 may be designed to have features usually associated with the high fidelity reproduction of the recorded signals. Thus, for example, turntable 11 may have a relatively large mass and be driven to have a uniform and precisely controlled rotational speed and to fully support the record disc R during each playing operation, and the bearings rotatably supporting the turntable may be, in turn, mounted precisely and securely, whereby to substantially eliminate wow and flutter from the reproduced or played back signals.

After the completion of the playing of signals recorded on a surface of record disc R, the playing of signals recorded on the opposite surface of the record disc requires that the latter be lifted from turntable 11 and then inverted or turned-over prior to being returned to turntable 11 with the surface of the record disc then facing upwardly being the surface thereof which faced downwardly and rested on turntable 11 during the earlier playing operation.

Figure 10:
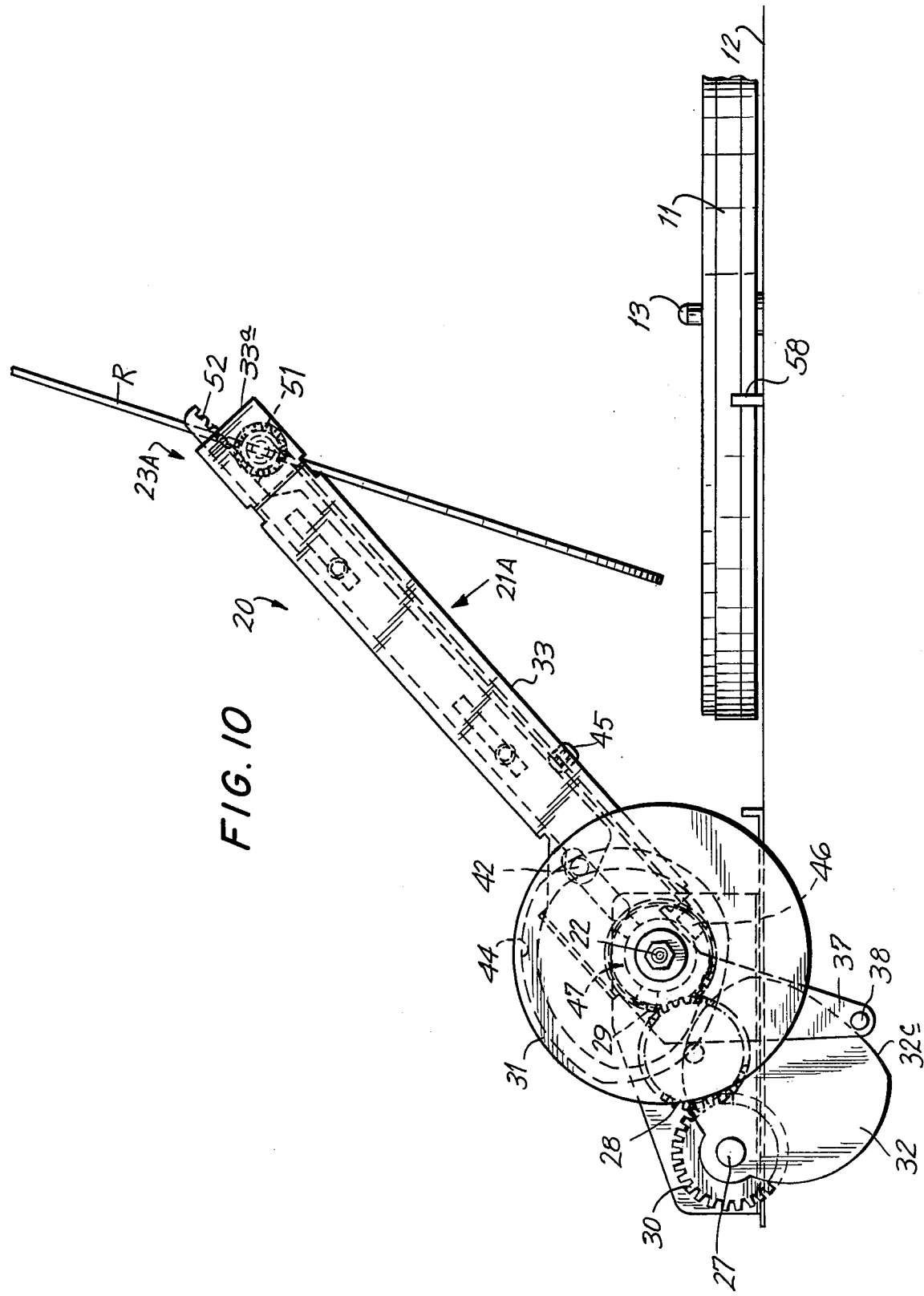
FIG. 10 is a view similar to that of FIG. 9, but showing the turn-over mechanism at a later stage in its operating cycle during which the gripped record is lifted from the turntable and is being inverted or turned-over.
Figure 11:
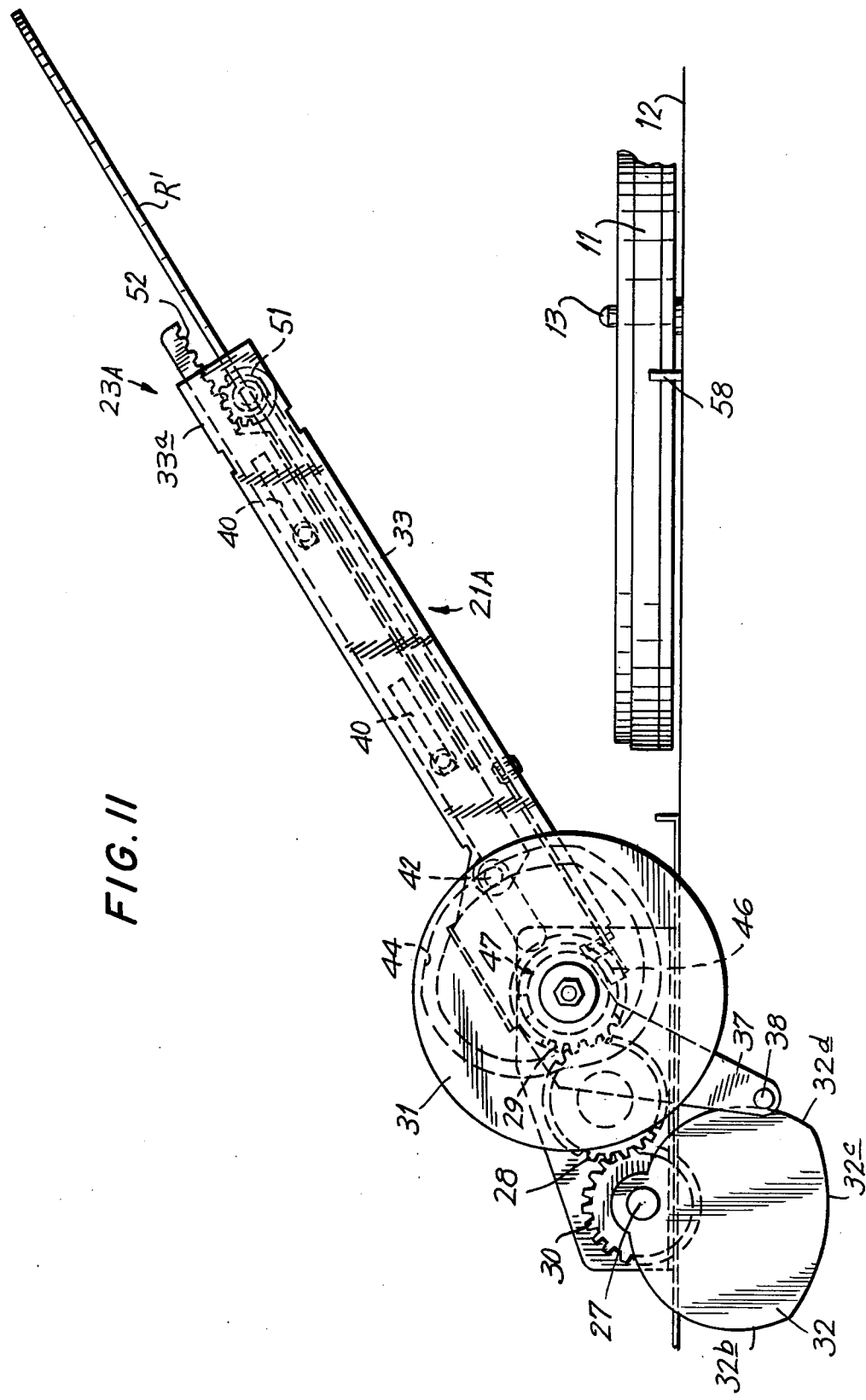
FIG. 11 is another view similar to that of FIG. 10, but showing a still later stage in the operating cycle of the turn-over mechanism during which the inverted record disc is being returned to the record player turntable.
Figure 14:
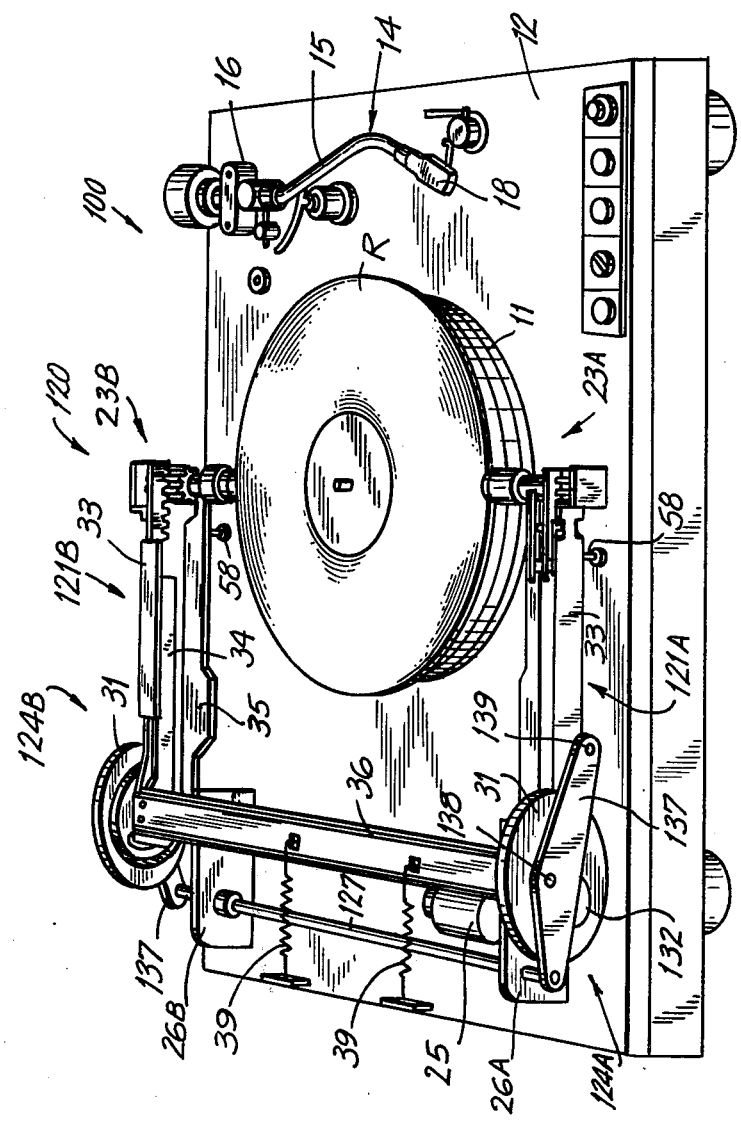
FIG. 14 is a perspective view similar to that of FIG. 1, but showing another embodiment of a turn-over mechanism according to this invention.

In order to effect the foregoing turning-over of the record disc R, the record player 10 is shown to further have a mechanism 20 according to this invention which generally comprises support means 21, for example, in the form of substantially parallel lever assemblies 21A and 21B, mounted on chassis 12 for swinging movements between lowered and raised positions (FIGS. 3 and 10) about an axis, for example, defined by a shaft 22, which is disposed to one side of turntable 11 and extends substantially parallel to a diameter of the turntable; a pair of spaced apart gripping means 23A and 23B directed inwardly towards each other from end portions of lever assemblies 21A and 21B, respectively, and being axially movable toward and away from each other and also turnable relative to the respective lever assemblies 21A and 21B about a common axis parallel with the shaft 22; cam assemblies 24A and 24B for effecting the swinging movements of the support means 21 about the axis of shaft 22 and the axial and turnable movements of the gripping means 23A and 23B; and means, for example, in the form of an electric motor 25, for driving the cam assemblies 24A and 24B through an operating cycle. In an initial stage of such operating cycle of record turn-over mechanism 20 according to this invention, the gripping means 23A and 23B are moved axially toward each other from released positions, in which the distance between the gripping means is larger than the diameter of record disc R, to gripping positions in which parts of the gripping means 23A and 23B are engaged with the periphery of record disc R on turntable 11 and diametrically opposed locations, and more precisely at the opposite ends of the diameter of record disc R that is parallel with the axis of shaft 22. Thus, with support means 21 in its lowered position, gripping means 23A and 23B engage the record disc on turntable 11 (FIGS. 8 and 9) and then the support means 21 are moved to the raised position (FIG. 10) for lifting the engaged record disc from turntable 11, whereupon the gripping means 23A and 23B are turned through 180° for inverting the lifted record disc (FIG. 11). Finally, the support means 21 are returned to the lowered position and the gripping means 23A and 23B are restored to their released positions (FIGS. 12 and 13) for disposing the inverted record disc R' on turntable 11.

Figure 2:
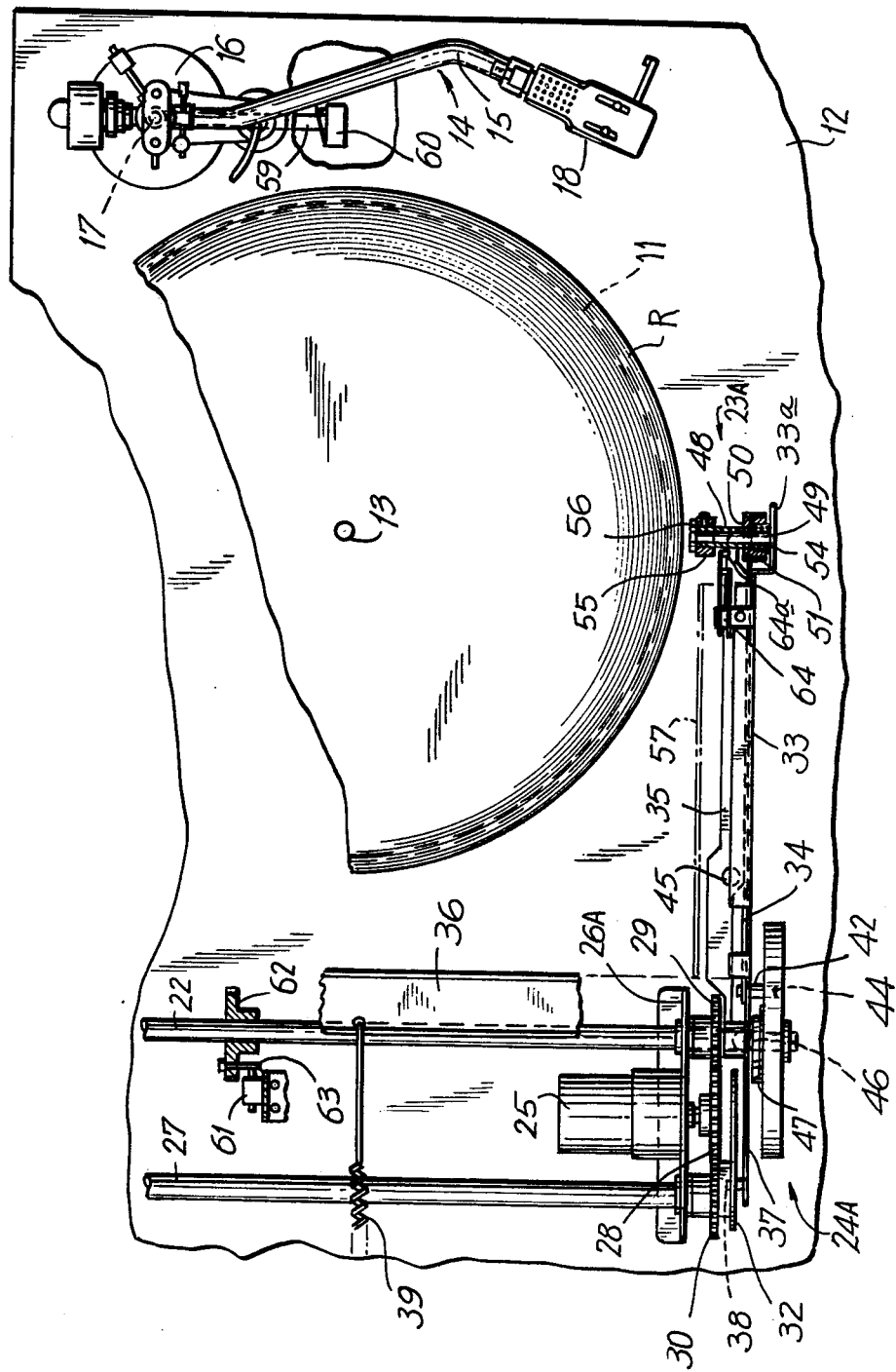
FIG. 2 is an enlarged, fragmentary top plan view of a portion of the record player shown on FIG. 1, with the turn-over mechanism thereof being shown in its inoperative or rest condition.

The shaft 22 which defines the axis of the swinging movements of support means 21 is shown to be suitably journaled in mounting brackets 26A and 26B secured on a side portion of chassis 12 adjacent the front and back, respectively of the latter. A cam shaft 27 is also journaled in brackets 26A and 26B and extends in spaced parallel relation to shaft 22 at the side of the latter facing away from turntable 11. The motor 25 for driving record turn-over mechanism 20 is mounted on bracket 26A between shafts 22 and 27 and a gear 28 is secured on the motor shaft and meshes with gears 29 and 30 secured on shafts 22 and 27, respectively, in front of bracket 26A (FIG. 2). Thus, shafts 22 and 27 are driven in the same direction, for example, in the clockwise direction as viewed from the front of record player 10, in response to operation of motor 25.

The cam assemblies 24A and 24B are symmetrically similar to each other and each includes a cam member 31 secured on the respective end portion of shaft 22 for controlling the previously mentioned axial and turning movements of the respective gripping means 23A or 23B, and a cam member 32 secured on the respective end of cam shaft 27 for controlling the swinging movements of support means 21 about the axis defined by shaft 22.

The lever assemblies 21A and 21B of support means 21 are also symmetrically similar and each includes a support lever 33, a turn-over control lever 34 and a gripping control lever 35. Each support lever 33 is pivotally mounted adjacent one end on the respective end portion of shaft 22 so as to be swingable in a vertical plane between a horizontal lowered position (FIGS. 1, 3 and 9) and a raised or upwardly tilted position (FIG. 10). The support levers 33 of lever assemblies 21A and 21B are shown to be interconnected by a rigid cross member 36 so as to swing as a unit between their lowered and raised positions. The support levers 33 of lever assemblies 21A and 21B are longitudinally dimensioned so that, in the lowered horizontal positions thereof, the free end portions 33a of support levers 33 are disposed adjacent opposite ends of the diameter of turntable 11 to which the axis of shaft 22 is parallel. Each support lever 33 has an arm 37 formed integrally therewith and inclined downwardly from the end of the respective support lever 33 pivotally mounted on shaft 22. A cam follower 38, for example, in the form of a laterally directed pin, extends from arm 37 and extends under the adjacent cam member 32 so as to bear upwardly against the peripheral surface of the latter. The peripheral surface of a cam member 32 forms a radial cam for controlling the swinging movements of support means 21 about the axis of shaft 22. It will be apparent that the weight of lever assemblies 21A and 21B with or without a record disc gripped between gripping means 23A and 23B acts to urge the support means 21 to its lowered horizontal position and to maintain engagement of cam follower pins 38 with the peripheral surfaces of the respective cam members 32. However, the weight of support means 21 is partly counterbalanced by means of coil springs 39 (FIGS. 1 and 2) connected between cross member 36 and anchoring tabs 12a on chassis 12. Springs 39, in yieldably urging support means 21 to swing upwardly, serve to minimize the power that needs to be developed by motor 25 for moving support means 21 to its raised position by the action of cams 32. Furthermore, springs 39 act to damp or cushion the final movement of support means 21 from the raised position back to the lowered horizontal position.

As shown particularly on FIGS. 3 and 4, each turn-over control lever 34 has a pair of longitudinally elongated slots 40 therein at locations spaced apart along lever 34, and headed guide pins 41 extend from the respective support lever 33 and are slidably received in slots 40. Thus, each turn-over control lever 34 is mounted for longitudinal movement relative to the respective support lever 33. As is particularly apparent on FIG. 4, the end of each turn-over control lever 34 adjacent shaft 22 has a cam follower pin 42 extending laterally therefrom through a slot 43 (shown in broken lines) in the respective support lever 33 and being slidably engaged in a cam groove 44 which opens axially in a radial surface of the adjacent cam member 31. As hereinafter described in detail, cam groove 44 is at varying radial distances from the axis of shaft 22 so that, in response to rotation of cam member 31, turn-over control lever 34 is longitudinally moved relative to the respective support lever 33.

Each gripping control lever 35 is mounted for lateral skewing movement relative to the respective support lever 33, for example, by a pivot pin 45 extending through lever 35 intermediate the ends of the latter. As shown particularly on FIG. 4, the end of each gripping control lever 35 adjacent shaft 22 carries a rotatable cam follower roller 46 which is engageable with an axial cam 47 on the adjacent cam member 31. The axial cam 47 is shown to be constituted by an annular flange directed axially from a radial face of cam member 31 and having an axially facing annular end surface at varying axial distances from the radial face of cam member 31. Thus, as cam member 31 is rotated, the engagement of cam follower roller 46 with the axially facing annular surface of axial cam 47 causes lateral skewing or rocking movements of the respective gripping control lever 35 relative to the respective support lever 33.

Each of the gripping means 23A and 23B is shown to comprise a cylindrical sleeve 48 which is loosely mounted on an axle 49 (FIG. 2) extending laterally from free end portion 33a of the respective support lever 33. Thus, sleeve 48 is rotatable on axle 49 and also axially movable along the latter. The end of sleeve 48 adjacent end portion 33a of the respective support lever 33 is of enlarged diameter to define a radial shoulder 50, and the circumferential surface of such enlarged diameter end is formed with teeth to define a pinion 51 (FIG. 5). As is shown, an end portion of each turn-over control lever 34 is in the form of a gear rack 52 meshing with the pinion 51 of the respective gripping means 23A or 23B so that sleeve 48 is turned or rotated about axle 49 in response to longitudinal movement of lever 34 relative to the respective support lever 33. Further, as shown, each gripping control lever 35 has a rounded end 53 engageable against the radial shoulder 50 for determining the axial positioning of sleeve 48. As shown particularly on FIGS. 2 and 8, the enlarged diameter end of each sleeve 48 has a counter bore or socket accommodating a helical compression spring 54 by which the sleeve 48 is urged axially in a direction away from end portion 33a of the respective support lever 33, that is, in the direction moving radial shoulder 50 against end portion 53 of gripping control lever 35 for maintaining contact of cam follower roller 46 with cam 47. Each of the gripping means 23A and 23B is completed by a collar 55 suitably secured on the end portion of sleeve 48 remote from the respective support lever 33 and carrying a frictional gripping member 56, for example, in the form of a rubber ring.

Figure 6:
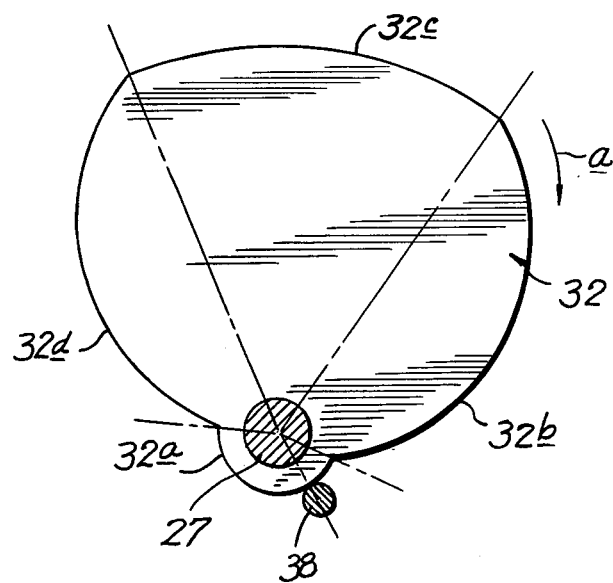
FIGS. 6 and 7 are elevational views of respective cam members included in the cam assembly appearing on FIG. 4.

Referring now to FIG. 6 in which cam member 32 is shown in the position thereof for the rest condition of the record turn-over mechanism 20, it will be seen that cam follower pin 38 is then engaged by a portion 32a of the radial cam which is at a relatively small radial distance from the axis of shaft 27, and which corresponds to the disposition of the respective support lever 33 in its lowered horizontal position, as on FIGS. 3 and 9. Considering the cam member 32 to be turned or rotated in the clockwise direction as indicated by the arrow a on FIG. 6, cam follower pin 38 is, after engagement by cam portion 32a, engaged in order by a cam portion 32b of progressively increasing radial distance from the axis of shaft 27, a cam portion 32c of uniformly relatively large radial distance from the axis of shaft 27, and a cam portion 32d of progressively decreasing radial distances from the axis of shaft 27 and which leads back to cam portion 32a. Thus, in the course of a full revolution of cam member 32 from the position shown on FIG. 6, and which corresponds to an operating cycle of turn-over mechanism 20, the respective support lever 33 will be initially maintained at its lowered horizontal position by cam portion 32a, and then moved by cam portion 32b to its raised position, as on FIG. 10, where it will be maintained for a predetermined interval by cam portion 32c, prior to the return of the support lever 33 to its lowered horizontal position, as on FIG. 13, by means of cam portion 32d.

Figure 7:
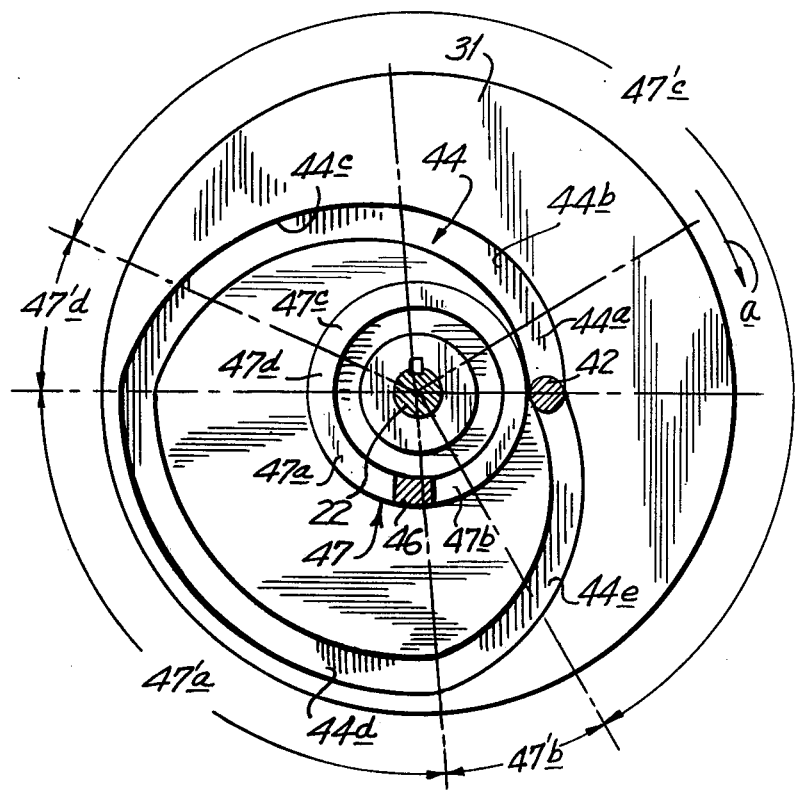

Referring now to FIG. 7 in which cam member 31 is shown in the position thereof corresponding to the rest condition of turn-over mechanism 20, it will be seen that the cam groove 44 is generally heart-shaped and includes cam groove portions 44a–44e which successively engage cam follower pin 42 during a complete revolution of cam member 31 in the direction of the arrow a in the course of an operating cycle of the turn-over mechanism. More particularly, the cam groove portion 44a is shown to be at a substantially uniform radial distance from shaft 22 and to have an angular extent substantially corresponding to the angular extent of cam portion 32a engaged by cam follower pin 38 in the initial stage of the operating cycle. Thus, during the period when each support lever 33 remains in its lowered horizontal position in the initial stage of the operating cycle, turn-over control lever 34 remains immobile relative to its respective support lever 33 and there is no turning of sleeve 48 of the respective gripping means. The following cam groove portions 44b and 44c have progressively increasing radial distances from the axis of shaft 22 and have an angular extent corresponding substantially to the combined angular extent of portions 32b and 32c of cam member 32. Thus, each turn-over control lever 34 is displaced longitudinally relative to the respective support lever 33 so that the engagement of gear rack 52 with pinion 51 effects turning of sleeve 48 through substantially 180° during the stages of the operating cycle when each support lever 33 is being moved upwardly to its raised position and then maintained at such raised position for the interval or dwell period determined by cam portion 32c. The following cam groove portion 44d is seen to be at a substantially uniform radial distance from the axis of shaft 22 so that, during the engagement of cam groove portion 44d with follower pin 42, turn-over control lever 34 remains immobile relative to the respective support lever 33 and there is no turning of sleeve 48 of the respective gripping means 23A or 23B. The angular extent of cam groove portion 44d is such as to correspond at least to the return or downward movement of each support lever 33 from its raised position back to its lowered horizontal position. The concluding cam groove portion 44e is shown to have progressively decreasing radial distances from the axis of shaft 22 so that, during the engagement of cam follower pin 42 by cam groove portion 44e, sleeve 48 of the respective gripping means 23A or 23B undergoes a return turning movement of 180°. Of course, at the time of such return turning movement of each sleeve 48, the axial cam 47 on cam member 31 has been effective to release the respective gripping means 23A or 23B from a record disc disposed on turntable 11.

With reference to FIG. 7, it will be seen that the axially facing annular surface of axial cam 47 includes axial cam portions 47a, 47b, 47c and 47d which respectively have the angular extents indicated at 47'a, 47'b, 47'c and 47'd on FIG. 7. As particularly shown on FIG. 4, axial cam portion 47a which engages cam follower roller 46 in the rest condition of turn-over mechanism 20 is at a relatively large axial distance from the adjacent radial face of cam member 31 so that the respective gripping control lever 35 is skewed relative to the respective support lever 33 in the direction causing its end 53 to act outwardly against shoulder 50 on sleeve 48 for moving the latter axially away from turntable 11 in opposition to the force of the respective spring 54. Thus, in the rest condition of turn-over mechanism 20, the rubber rings or frictional members 56 of gripping means 23A and 23B are held in released positions (FIG. 2) in which the distance between the frictional members 56 is larger than the diameter of the record disc R on turntable 11 for releasing the record disc therebetween. Immediately upon the commencement of an operating cycle, cam follower roller 46 is engaged by axial cam portion 47b which is inclined toward the radial face of cam member 31 so that the respective gripping control lever 35 no longer prevents spring 54 of the respective gripping means 23A or 23B from axially displacing the sleeve 48 in the direction for moving the frictional member or rubber ring 56 to its gripping position in engagement with the periphery of the record disc R on turntable 11. Thereafter, during the phase of the operating cycle represented by the relatively large angular extent 47'c of axial cam portion 47c, the respective gripping means 23A or 23B is maintained in its gripping position due to the uniform relatively small axial distance of axial cam portion 47c from the radial face of cam member 31. Finally, the axial cam portion 47d is inclined in the direction away from the radial face of cam member 31 so that, during the engagement of cam follower roller 46 with cam portion 47d, the respective gripping control lever 35 is skewed in the direction to return the respective gripping means 23A or 23B to its released position. The angular extent 47'd of axial cam portion 47d is selected so that the respective gripping means 23A or 23B will be moved to its released position prior to the previously described return turning of the gripping means resulting from the engagement of cam groove portion 44e with cam follower pin 42. During such return turning of the gripping means 23A or 23B, the latter is maintained in its released position by the engagement of axial cam portion 47a with cam follower roller 46.

As indicated in broken lines at 57 on FIG. 2, a cover 57 may be mounted at the inner side of each support lever 33 to cooperate with the latter in enclosing the respective turn-over control lever 34 and gripping control lever 35. Further, a post 58 (FIG. 3) may extend upwardly from chassis 12 by an adjustably determined distance to act as a rest for each support lever 33 and thereby adjustably determine the lowered position of the respective lever assembly 21A or 21B.

As shown on FIG. 2, an arm 59 extends radially from shaft 17 and is suitably rotatably coupled with tone arm 15 to swing with the latter, and a normally open switch 60 is mounted below chassis 12 so as to be actuated to its closed position by arm 59 only when tone arm 15 is in its rest position. Another switch 61 which is normally closed is mounted adjacent shaft 22, and a flange 62 is secured on shaft 22 and carries an axially extending pin 63 which actuates switch 61 to its open position only when shaft 22 is in its initial position, that is, only when cam members 31 and 32 of cam assemblies 24A and 24B are disposed as shown in FIGS. 6 and 7 for establishing the rest condition of turn-over mechanism 20. However, upon the commencement of an operating cycle of such turn-over mechanism, the corresponding turning of shaft 22 moves pin 63 away from switch 61 so that the latter returns to its normally closed position. Finally, a normally closed switch 64 is shown to be mounted on the free end portion of support lever 33 of lever assembly 21A. Such switch 64 includes a switch actuator 64a extending into the path of movement of shoulder 50 on sleeve 48 of gripping means 23A so that switch 64 is opened in response to axial movement of sleeve 48 by spring 54 beyond the position in which the frictional member 56 would normally grip the edge of a record disc. In this connection, it should be noted that the skewed movement of gripping control lever 35 permitted by the engagement of control follower roller 46 with axial cam portion 47c is sufficient to move the end 53 of lever 35 away from shoulder 50 even when sleeve 48 of gripping means 23A has been axially displaced by spring 54 so as to engage frictional member 56 with the periphery or edge of record disc R, as shown on FIG. 8. Therefore, if a record disc is absent from the turntable 11 at a time when gripping control lever 35 is moved to the position shown on FIG. 8, spring 54 is effective to move sleeve 48 beyond the position shown on FIG. 8 with the result that shoulder 50 acts against switch actuator 64a for opening switch 64.

Figure 18:
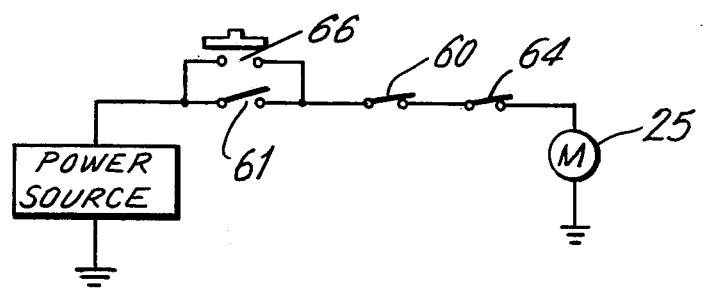
FIG. 18 is a diagrammatic view of a control circuit for the turn-over mechanism of a record player in accordance with this invention.

As shown on FIG. 18, in a circuit for energizing motor 25, the switches 60, 61 and 64 are connected in series between motor 25 and a suitable power source 65, and the energizing circuit further includes a normally open switch 66 connected in parallel with switch 61 and being momentarily closed, either manually or automatically, for initiating an operating cycle of record turn-over mechanism 20.

The above-described record player 10 according to this invention operates as follows:

Initially, a record disc R is placed on turntable 11 and tone arm 15 is either manually or automatically moved from its rest position to a desired set-down position on the record disc to commence the playing of the audio or other signals recorded on the upwardly facing surface of the record disc. For the duration of the playing operation, tone arm 15 is displaced from its rest position so that the associated arm 59 does not engage switch 60 and the latter is in its normal open position to prevent the energizing of motor 25. Thus, during the playing or reproducing of signals recorded on record disc R, turn-over mechanism 20 remains in its rest position shown on FIGS. 2 and 3 with cam members 31 and 32 being disposed as shown on FIGS. 6 and 7. Since an operating cycle of turn-over mechanism 20 cannot be initiated during a playing operation of record player 10, damage to the tone arm assembly 14 or to the mechanism 20 is avoided.

When the playing of signals recorded on the upwardly facing surface of record disc R has been completed, tone arm 15 is conventionally returned to its rest position, either automatically or manually, and the drive (not shown) for turntable 11 is deenergized. In response to the return of tone arm 15 to its rest position, arm 59 actuates switch 60 to its closed position. Thereupon, switch 66 can be momentarily closed either by manual actuation thereof or automatically in response to return of the tone arm to its rest position, with the result that motor 25 is energized to commence the operating cycle of turn-over mechanism 20.

When motor 25 is energized, shafts 22 and 27 are rotated by way of meshing gears 28, 29 and 30 so that cam members 31 and 32 are rotated in the clockwise direction, that is, in the directions of the arrows a on FIGS. 6 and 7. As soon as shaft 22 begins to turn from its initial position, pin 63 disengages switch 61 so that the latter closes and thereby continues the energization of motor 25 when the momentarily closed switch 66 returns to its normal open condition.

During the time that cam follower pin 38 continues to be engaged by cam portion 32a (FIG. 6) cam follower pin 42 engages cam groove portion 44a and cam follower roller 46 is engaged by the inclined or sloping axial cam portion 47b. By reason of the foregoing, support lever 33 of each of lever assemblies 21A and 21B remains in its lowered horizontal position and the respective gripping means 23A or 23B is held against turning, while the pressure of the end 53 of gripping control lever 35 axially outward against shoulder 50 of the respective sleeve 48 is relaxed to permit spring 54 to urge the respective sleeve 48 axially in the inward direction for engaging the frictional member 56 against the adjacent edge of record disc R. Thus, gripping means 23A and 23B are synchronously moved axially toward each other for gripping the periphery or edge of record disc R at diametrically opposed locations on the latter. Since a record disc is disposed on turntable 11 for engagement at diametrically opposed locations by gripping means 23A and 23B, the axial movements of the latter toward each other under the influence of the respective springs 54 are limited by engagement with the record, and shoulder 50 on sleeve 48 of gripping means 23A does not come into contact with switch actuator 64a with the result that switch 64 remains closed to continue the operation of motor 25.

In the course of the resulting continued turning of cam members 31 and 32 of each cam assembly 24A or 24B, cam follower pins 38 and 42 are respectively engaged by cam portion 32b and cam groove portion 44b while cam follower roller 46 is engaged by axial cam portion 47c. As a result of the engagement of cam follower pin 38 by radial cam portion 32b, pin 38 is depressed or moved downwardly so that the respective support lever 33 is swung upwardly about shaft 22. At the same time, the engagement of cam follower pin 42 by cam groove position 44b causes longitudinal movement of the respective turn-over control lever 34 relative to support lever 33 so that gear rack 52 and pinion 51 cooperate to turn the respective gripping means 23A or 23B. During such turning of gripping means 23A or 23B, the engagement of cam follower roller 46 by axial cam portion 47c ensures that the spring 54 of each gripping means can remain effective to maintain gripping engagement of the frictional member 56 with the edge of record disc R. Thus, the record disc R is lifted from turntable 11 and, simultaneously, the turning-over of the record disc is commenced.

As the turning of cam members 31 and 32 continues, the respective support lever 33 reaches its fully raised position, as on FIG. 10, and is held in such fully raised position by the engagement of radial cam portion 32c with cam follower pin 38. Simultaneously, cam groove portion 44c engages cam follower pin 42 so as to effect further longitudinal movement of turn-over control lever 34 relative to support lever 33 for completing the turning-over or inverting of the record disc, while axial cam portion 47c continues to engage cam follower roller 46 for maintaining the gripping action of each of the gripping means 23A and 23B on the record disc.

After the record disc has been turned through a full 180° relative to lever assemblies 21A and 21B, and thus is inverted as at R' on FIG. 11, further rotation of cam members 31 and 32 causes radial cam portion 32d to engage cam follower pin 38 so that each support lever 33 is swung downwardly, while cam groove portion 44d engages cam follower pin 42 to prevent turning of the respective gripping means 23A or 23B and axial cam portion 47c continues to engage cam follower roller 46 for maintaining the respective gripping means 23A or 23B in its gripping position. Thus, the inverted record disc R' is returned to the surface of turntable 11.

After each support lever 33 has returned to its lowered horizontal position to dispose the inverted record disc R' on turntable 11, further turning of cam members 31 and 32 causes radial cam portion 32a to engage cam follower pin 38 for maintaining the respective support lever 33 in its lowered horizontal position, while the sloping axial cam portion 47d and then the following cam portion 47a engages cam follower roller 46 to cause lateral rocking or skewing of the respective gripping control lever 35 in the direction to outwardly displace the respective sleeve 48 against the force of spring 54 and thereby dispose the respective gripping means 23A or 23B in the released position thereof, as shown on FIGS. 12 and 13.

During the final turning of cam members 31 and 32 for the return thereof to their original positions, cam follower pin 38 continues to be engaged by radial cam portion 32a and cam follower roller 46 continues to be engaged by axial cam portion 47a, while cam follower pin 42 is engaged by cam groove portion 44e which thereby effects longitudinal return movement of the respective turn-over control lever 34 relative to support lever 33 for turning the respective gripping means 23A or 23B to its original position. As cam members 31 and 32 return to the positions shown on FIGS. 6 and 7, switch actuating pin 63 on shaft 22 again engages switch 61 for opening the latter and thereby halting the energizing of motor 25. Thus, the operation of motor 25 is halted at the completion of an operating cycle of record turn-over mechanism 20.

After the inverted record disc R' has been placed on turntable 11 and freed from turn-over mechanism 20, the tone arm assembly 14 can again be conventionally employed to playback or reproduce the sound or other signals recorded on the upwardly facing surface of the inverted record disc R'.

It will be noted that the springs 39 connected between crossmember 36 of support means 21 and chassis 12 assist in the lifting of the record from the turntable so that the motor 25 for effecting the operation of turn-over mechanism 20 need not be very powerful. Further, during the returning of the inverted record disc R' to the turntable, springs 39 serve to damp or cushion the return movement of the inverted record disc onto the turntable so as to avoid damage to the record disc.

Further, at any of the times in the operating cycle during which each cam follower roller 46 is engaged by the respective axial cam portion 47c, if the respective gripping means 23A or 23B fails to grip the edge of a record disc which thereby limits the axial movement of the gripping means under the influence of its spring 54, the resulting increased axial movement of sleeve 48 of gripping means 23A by spring 54 causes shoulder 50 to engage switch actuator 64a and thereby open switch 64 so as to deenergize motor 25. Thus, further operation of turn-over mechanism 20 is prevented if no record disc is present on turntable 11, or if, for any reason whatsoever, the gripping means 23A and 23B do not properly grip a record disc therebetween.

Referring now to FIGS. 14–17 of the drawings, it will be seen that a record player 100 there illustrated to have a record turn-over mechanism 120 according to another embodiment of this invention is, in many respects, similar to the first-described embodiment, and has its several parts which correspond to parts of the previously described record player 10 identified by the same reference numerals. More particularly, the turn-over mechanism 120 differs substantially from the previously-described mechanism 20 in respect to its support means 121 made up of lever assemblies 121A and 121B and the manner in which the support levers 33 of such lever assemblies are moved swingably about the axis of shaft 22 between the previously described lowered horizontal positions and raised positions.

In the turn-over mechanism 120, the previously-described arms 37 are omitted from support levers 33, and cam members 132 of cam assemblies 124A and 124B for effecting the swinging movements of support levers 33 about the axis of shaft 22 are secured on the shaft 22 adjacent the respective cam member 31 which, as in the earlier-described embodiment, is rotatable with shaft 22. Further, in turn-over mechanism 120, a shaft 127 which replaces the previously-described shaft 27 is no longer rotated in response to operation of motor 25, and merely serves to pivotally support, at its opposite ends, rocking levers 137 which are included in lever assemblies 121A and 121B. Each of the rocking levers 137 carries, intermediate its ends, a cam follower pin 138 which rests upon the radial cam defined by the peripheral edge surface of the respective cam member 132. Finally, each of the rocking levers 137, at the end thereof remote from shaft 127, carries an inwardly directed lever actuating pin 139 which extends under the respective support lever 33 intermediate the ends of the latter. Thus, swinging of rocking levers 137 about the axis of shaft 127 in response to the rotation of cam members 132 with shaft 22 and the action of the radial cam surfaces of cam members 132 on cam follower pins 138 is effective to cause corresponding swinging movements of support levers 33 about the axis of shaft 22.

Figure 17:
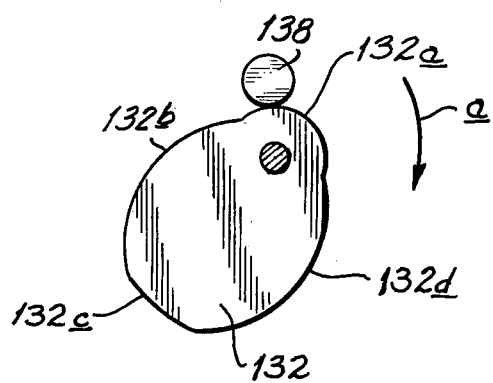
FIG. 17 is an elevational view of one of the cam members included in the turn-over mechanism of FIG. 14.

As shown on FIG. 17 where the cam member 132 of one of the cam assemblies 124A and 124B is shown in its initial position corresponding to the rest condition of turn-over mechanism 120, such cam member 132 has successive cam surface portions 132a, 132b, 132c and 132d which, upon turning of cam member 132 in the direction of the arrow a, successively engage the respective cam follower pin 138. The cam surface portions 132a, 132b, 132c and 132d have angular extents that substantially correspond to the angular extents of the cam portions 32a, 32b, 32c and 32d, respectively, of cam member 32 in the earlier-described embodiment. Further, the cam surface portions 132a–132d of cam member 132 have substantially the same angular relationships to the various portions of the cam groove 44 and of the axial cam 47 on the respective cam member 31 as were described for the cam portions 32a–32d in the first-described embodiment.

More particularly, it will be seen that cam portion 132a is at a relatively small constant radial distance from the axis of shaft 22 so that, when the respective cam follower pin 138 is engaged by cam surface portion 132a, the respective support lever 33 is in its lowered horizontal position. Considering the cam member 132 to be turned or rotated in the clockwise direction as indicated by the arrow a on FIG. 17, cam follower pin 138 is, after engagement by cam portion 132a, engaged in order by cam portion 132b of progressively increasing radial distance from the axis of shaft 22, cam portion 132c of uniformly large radial distance from the axis of shaft 22, and cam portion 132d of progressively decreasing radial distances from the axis of shaft 22 and which leads back to cam portion 132a. Thus, in the course of a full revolution of each cam member 132 from the position shown on FIG. 17, and which corresponds to an operating cycle of turn-over mechanism 120, the respective support lever 33 will be initially maintained at its lowered horizontal position by cam portion 132a, at which time, gripping means 23A and 23B are moved axially to their gripping positions to engage record disc R by the action of axial cam 47 of each cam member 31 on the respective cam follower roller 46. Thereafter, while gripping means 23A and 23B are maintained in their gripping positions, cam portion 132b of each cam member 132 will effect movement of the respective support lever 33 to its raised position where it will be maintained for a predetermined interval by cam portion 132c while cam groove 44 of the respective cam member 31 cooperates with cam follower pin 42 to cause turning of gripping means 23A and 23B for inverting the record disc gripped thereby. Finally, in response to the engagement of cam portion 132d with cam follower 138, the respective support lever 33 is returned to its lowered horizontal position for placing the inverted record disc on the turntable 11, whereupon gripping means 23A and 23B are displaced axially to their released positions for freeing the inverted record disc on the turntable and, finally, the gripping means 23A and 23B are turned back to their original positions, all as previously described in connection with the operation of turn-over mechanism 20.

It will be apparent that, in the record turn-over mechanism 120, the actuating pin 139 extending from the free end of each rocking lever 137, and by which the respective support lever 33 is swung vertically about the axis of shaft 22, undergoes a relatively larger vertical displacement than the vertical movement of the cam follower pin 138 disposed intermediate the ends of the rocking lever 137 and engageable by the periphery of cam member 132. Therefore, the cam member 132 may be given relatively smaller dimensions than the corresponding cam member 32 in the first-described embodiment for effecting a predetermined angular displacement of each of the support levers 33 between the lowered horizontal and raised positions thereof. By reason of such relatively smaller dimension of each cam member 132 and the mounting thereof on the same shaft 22 as the respective cam member 31, the turn-over mechanism 120 can be made relatively more compact than the previously-described mechanism 20. Apart from the foregoing, it will be apparent that the mechanism 120 has all of the functional features and advantages previously described with reference to the turn-over mechanism 20.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A record player comprising a chassis; a turntable mounted on said chassis for rotation in a substantially fixed horizontal plane; a tone arm mounted on said chassis for reproducing signals recorded on the upwardly facing surface of a record disc rotatably supported by said turntable; and a record turn-over mechanism including support means mounted on said chassis for swinging movements between raised and lowered positions about an axis disposed to one side of said turntable and extending substantially parallel to a diameter of the turntable, said support means having end portions which, in said lowered position, are disposed adjacent opposite ends of said diameter of the turntable, a pair of spaced apart gripping means directed inwardly towards each other from said end portions, respectively, of the support means, at least parts of said gripping means being axially movable relative to said end portions toward and away from each other between gripping positions in which said parts of the gripping means are engageable with diametrically opposed locations on the periphery of a record disc and released positions in which the distance between said parts of the gripping means is larger than the diameter of the record disc for releasing the latter therebetween, said gripping means also being turnable relative to said support means about a common axis parallel with said axis of the swinging movements of the support means, cam means for effecting said swinging movements of the support means and said axial and turnable movements of the gripping means, and means for driving said cam means through an operating cycle in which said gripping means are moved from said released positions to said gripping positions with said support means in said lowered position for engaging a record disc on the turntable and then said support means are moved to said raised position for lifting the engaged record disc from the turntable, whereupon said gripping means are turned through 180° for inverting the lifted record disc and said support means are then returned to said lowered position and said gripping means are restored to said released positions for disposing the inverted record disc on said turntable.

2. A record player according to claim 1; in which said support means includes a pair of lever assemblies extending in a fixed substantially parallel relation to each other from said axis to one side of the turntable and having free end portions constituting said end portions of the support means from which said pair of gripping means respectively extend.

3. A record player according to claim 2; in which each of said lever assemblies includes a support lever mounted for pivoting about said axis to one side of the turntable and a turn-over control lever carried by the respective support lever and being movable relative to the latter for effecting said turnable movements of the respective gripping means; and in which said cam means includes cam members having at least first and second cam surfaces for respectively effecting the pivotal movements of said support lever and the movements of said turn-over control lever relative to the respective support lever.

4. A record player according to claim 3; in which each of said lever assemblies further includes a gripping control lever also carried by the respective support lever and movable relative to the latter for effecting movement of the respective gripping means between said gripping and released positions; and in which said cam members further have a third cam surface for effecting movements of said gripping control lever relative to said support lever.

5. A record player according to claim 4; in which said cam members are rotatable about respective axes parallel with said axis of the pivotal movements of each support lever.

6. A record player according to claim 5; in which said first cam surface is on one of said cam members and said second and third cam surfaces are on another of said cam members.

7. A record player according to claim 6; in which said first cam surface is a radial cam, said second cam surface is a cam groove, and said third cam surface is an axial cam.

8. A record player according to claim 1; in which said tone arm is movable from a rest position alongside said turntable during the reproducing of signals recorded on a record disc; and in which said means for driving the cam means includes an electric motor operable for rotating said cam means, an energizing circuit for operating said motor including normally open switch means in series with said motor, and switch actuating means movable with said tone arm to close said switch means and thereby permit operation of said motor only when said tone arm is in said rest position.

9. A record player according to claim 1; in which the axial movement of said gripping means toward each other to said gripping positions is limited by a record disc when said gripping means engage the periphery of the record disc; and in which said means for driving the cam means includes an electric motor operable for rotating said cam means, an energizing circuit for operating said motor including normally closed switch means in series with said motor, and means for opening said switch means to halt the operation of said motor in response to the unlimited axial movement of said gripping means to said gripping positions when a record disc is absent from the turntable.

10. A record player according to claim 1; in which said means for driving the cam means includes an electric motor operable for rotating said cam means with one revolution of the latter from a rest position corresponding to said operating cycle, an energizing circuit for said motor including a parallel circuit of first and second switches in series with the motor, said first switch being normally open and adapted to be temporarily closed for initiating said operating cycle and said second switch being normally closed, and actuating means for said second switch being rotatable with said cam means to open said second switch when said cam means is in said rest position, whereby to halt the operation of said motor upon the completion of said operating cycle.

11. A record player comprising a chassis; a turntable mounted on said chassis for rotation in a substantially fixed horizontal plane; a tone arm mounted on said chassis for reproducing signals recorded on the upwardly facing surface of a record disc rotatably supported by said turntable; and a record turn-over mechanism including support means mounted on said chassis for swinging movements between raised and lowered positions about an axis disposed to one side of said turntable and extending substantially parallel to a diameter of the turntable, said support means including a pair of lever assemblies extending substantially parallel to each other from said axis to one side of the turntable and having free end portions which, in said lowered position, are disposed adjacent opposite ends of said diameter of the turntable, a pair of spaced apart gripping means directed inwardly towards each other from said free end portions, respectively, of said lever assemblies, at least parts of said gripping means being axially movable toward and away from each other between gripping positions in which said parts of the gripping means are engageable with diametrically opposed locations on the periphery of a record disc and released positions in which the distance between said parts of the gripping means is larger than the diameter of the record disc for releasing the latter therebetween, said gripping means also being turnable relative to said support means about a common axis parallel with said axis of the swinging movements of the support means, each of said lever assemblies including a support lever mounted for pivoting about said axis to one side of the turntable and a turn-over control lever carried by the respective support lever and being movable relative to the latter for effecting turnable movements of the respective gripping means, and a gripping control lever also carried by the respective support lever and movable relative to the latter for effecting movement of the respective gripping means between said gripping and released positions, cam means for effecting said swinging movements of the support means and said axial and turnable movements of the gripping means, said cam means including cam members having at least first, second, and third cam surfaces for respectively effecting the pivotal movements of said support lever, the movements of said turn-over control lever relative to the respective support lever, and the movements of said gripping control lever relative to said support lever, said cam members being rotatable about respective axes parallel with said axis of the pivotal movements of each support lever, and said first cam surface being on one of said cam members and said second and third cam surfaces being on another of said cam members, the axis of said one cam member being spaced from said axis of the pivotal movements of the respective support lever which has an actuating arm extending therefrom and carrying a cam follower engaging said first cam surface, said other cam member having the axis thereof coincident with said axis of the pivotal movements of the respective support lever, and means for driving said cam means through an operating cycle in which said gripping means are moved from said released positions to said gripping positions with said support means in said lowered position for engaging a record disc on the turntable and then said support means are moved to said raised position for lifting the engaged record disc from the turntable, whereupon said gripping means are turned through 180° for inverting the lifted record disc and said support means are then returned to said lowered position and said gripping means are restored to said released positions for disposing the inverted record disc on said turntable.

12. A record player comprising a chassis; a turntable mounted on said chassis for rotation in a substantially fixed horizontal plane; a tone arm mounted on said chassis for reproducing signals recorded on the upwardly facing surface of a record disc rotatably supported by said turntable; and a record turn-over mechanism including support means mounted on said chassis for swinging movements between raised and lowered positions about an axis disposed to one side of said turntable and extending substantially parallel to a diameter of the turntable, said support means including a pair of lever assemblies extending substantially parallel to each other from said axis to one side of the turntable and having free end portions which, in said lowered position, are disposed adjacent opposite ends of said diameter of the turntable, a pair of spaced apart gripping means directed inwardly towards each other from said free end portions, respectively, of said lever assemblies, at least parts of said gripping means being axially movable toward and away from each other between gripping positions in which said parts of the gripping means are engageable with diametrically opposed locations on the periphery of a record disc and released positions in which the distance between said parts of the gripping means is larger than the diameter of the record disc for releasing the latter therebetween, said gripping means also being turnable relative to said support means about a common axis parallel with said axis of the swinging movements of the support means, each of said lever assemblies including a support lever mounted for pivoting about said axis to one side of the turntable and a turn-over control lever carried by the respective support lever and being movable relative to the latter for effecting turnable movements of the respective gripping means, and a gripping control lever also carried by the respective support lever and movable relative to the latter for effecting movement of the respective gripping means between said gripping and released positions, cam means for effecting said swinging movements of the support means and said axial and turnable movements of the gripping means, said cam means including cam members having at least first, second, and third cam surfaces for respectively effecting the pivotal movements of said support lever, the movements of said turn-over control lever relative to the respective support lever, and movements of said gripping control lever relative to said support lever, said cam members being rotatable about respective axes parallel with said axis of the pivotal movements of each support lever and movements of said gripping control lever relative to said support lever, cam surface being on one of said cam members and said second and third cam surfaces being on another of said cam members, said one cam member and said other cam member having their respective axes coincident with said axis of the pivotal movements of the respective support lever, and each of said lever assemblies further including a rocking lever pivoted on an axis that is parallel to and spaced from said axis of the pivotal movements of said respective support lever, a cam follower on said rocking lever engaging said first cam surface so that the latter rocks said rocking lever, and an actuator on said rocking lever engaging the respective support lever to pivot the latter in response to rocking of said rocking lever, said turn-over mechanism further including means for driving said cam means through an operating cycle in which said gripping means are moved from said released positions to said gripping positions with said support means in said lowered position for engaging a record disc on the turntable and then said support means are moved to said raised position for lifting the engaged record disc from the turntable, whereupon said gripping means are turned through 180° for inverting the lifted record disc and said support means are then returned to said lowered position and said gripping means are restored to said released positions for disposing the inverted record disc on said turntable.

13. A record player comprising a chassis; a turntable mounted on said chassis for rotation in a substantially fixed horizontal plane; a tone arm mounted on said chassis for reproducing signals recorded on the upwardly facing surface of a record disc rotatably supported by said turntable; and a record turn-over mechanism including support means mounted on said chassis for swinging movements between raised and lowered positions about an axis disposed to one side of said turntable and extending substantially parallel to a diameter of the turntable, said support means including a pair of lever assemblies extending substantially parallel to each other from said axis to one side of the turntable and having free end portions which, in said lowered position, are disposed adjacent opposite ends of said diameter of the turntable, a pair of spaced apart gripping means directed inwardly towards each other from said free end portions, respectively, of said lever assemblies, at least parts of said gripping means being axially movable toward and away from each other between gripping positions in which said parts of the gripping means are engageable with diametrically opposed locations on the periphery of a record disc and released positions in which the distance between said parts of the gripping means is larger than the diameter of the record disc for releasing the latter therebetween, said gripping means also being turnable relative to said support means about a common axis parallel with said axis of the swinging movements of the support means, in which each of said lever assemblies includes a support lever mounted for pivoting about said axis to one side of the turntable and a turn-over control lever carried by the respective support lever and being movable relative to the latter for effecting turnable movements of the respective gripping means, said turn-over control lever being mounted for longitudinal movement relative to said respective support lever, and in which each of said lever assemblies further includes a gripping control lever also carried by the respective support lever and movable relative to the latter for effecting movement of the respective gripping means between said gripping and released positions, said gripping control lever being mounted for lateral skewing movement relative to said respective support lever, cam means for effecting said swinging movements of the support means and said axial and turnable movements of the gripping means, said cam means including cam members having at least first, second, and third cam surfaces for respectively effecting the pivotal movements of said support lever, the movements of said turn-over control lever relative to the respective support lever, and the movements of said gripping control lever relative to said support lever, and means for driving said cam means through an operating cycle in which said gripping means are moved from said released positions to said gripping positions with said support means in said lowered position for engaging a record disc on the turntable and then said support means are moved to said raised position for lifting the engaged record disc from the turntable, whereupon said gripping means are turned through 180° for inverting the lifted record disc and said support means are then returned to said lowered position and said gripping means are restored to said released positions for disposing the inverted record disc on said turntable.

14. A record player according to claim 13; in which said second and third cam surfaces are on a common one of said cam members which is rotatable about said axis of the pivotal movements of each said support lever, said second cam surface is in the form of a cam groove at varying radial distances from said axis of rotation of the common cam member and being engaged by a cam follower on said turn-over control lever, and said third cam surface is in the form of an axial cam of varying axial positions along said axis of rotation of said common cam member and being engaged by a cam follower on said gripping control lever.

15. A record player according to claim 13; in which each of said gripping means includes a cylindrical member which is mounted on the free end portion of the respective support lever for movement relative to the latter in the direction of the axis of said cylindrical member and rotationally about such axis; and in which said gripping control lever engages said cylindrical member for determining the axial position of the latter in dependence on said lateral skewing movement of the gripping control lever, and said turn-over control lever engages said cylindrical member for effecting rotational movement of the latter in response to longitudinal movement of said turn-over control lever relative to said support lever.

16. A record player according to claim 15, in which said cylindrical member has a resiliently flexible pad at an end thereof for softly and frictionally engaging the periphery of a record disc in said gripping position.

17. A record player according to claim 15; in which said gripping means further includes spring means urging said cylindrical member axially to said gripping position thereof, said cylindrical member has an annular shoulder thereof, and said gripping control lever has an end engageable against said shoulder for moving said cylindrical member axially to said released position against the urging of said spring means.

18. A record player according to claim 15, in which said turn-over control lever has an end portion with a gear rack thereon, and said cylindrical member of each gripping means has a pinion thereon engaged by said gear rack on the respective turn-over control lever so that said longitudinal movement of the latter causes rotational movement of said cylindrical member.

19. A record player comprising a chassis; a turntable mounted on said chassis for rotation in a substantially fixed horizontal plane; a tone arm mounted on said chassis for reproducing signals recorded on the upwardly facing surface of a record disc rotatably supported by said turntable; and a record turn-over mechanism including support means mounted on said chassis for swinging movements between raised and lowered positions about an axis disposed to one side of said turntable and extending substantially parallel to a diameter of the turntable, said support means including a pair of lever assemblies extending substantially parallel to each other from said axis to one side of the turntable and having free end portions which, in said lowered position, are disposed adjacent opposite ends of said diameter of the turntable, a pair of spaced apart gripping means directed inwardly towards each other from said free end portions, respectively, of said lever assemblies, at least parts of said gripping means being axially movable toward and away from each other between gripping positions in which said parts of the gripping means are engageable with diametrically opposed locations on the periphery of a record disc and released positions in which the distance between said parts of the gripping means is larger than the diameter of the record disc for releasing the latter therebetween, said gripping means also being turnable relative to said support means about a common axis parallel with said axis of the swinging movements of the support means, each of said lever assemblies including a support lever mounted for pivoting about said axis to one side of the turntable and a turn-over control lever carried by the respective support lever and being movable relative to the latter for effecting turnable movements of the respective gripping means, cam means for effecting said swinging movements of the support means and said axial and turnable movements of the gripping means, said cam means including cam members having at least first and second cam surfaces for respectively effecting the pivotal movements of said support lever and the movements of said turn-over control lever relative to the respective support lever, means for driving said cam means through an operating cycle in which said gripping means are moved from said released positions to said gripping positions with said support means in said lowered position for engaging a record disc on the turntable and then said support means are moved to said raised position for lifting the engaged record disc from the turntable, whereupon said gripping means are turned through 180° for inverting the lifted record disc and said support means are then returned to said lowered position and said gripping means are restored to said released positions for disposing the inverted record disc on said turntable, and biasing means for upwardly urging said lever assemblies.

20. A record player according to claim 19, in which said support means further includes a cross-member extending between the support levers of the lever assemblies, and said biasing means include at least one spring connected between said cross-member and said chassis.

* * * * *